United States Patent
Satake et al.

(10) Patent No.: US 7,128,184 B2
(45) Date of Patent: Oct. 31, 2006

(54) MOTOR-DRIVEN POWER STEERING CONTROL APPARATUS

(75) Inventors: Toshihide Satake, Tokyo (JP); Masahiko Kurishige, Tokyo (JP); Kazumichi Tsutsumi, Tokyo (JP); Chiaki Fujimoto, Tokyo (JP); Noriyuki Inoue, Tokyo (JP)

(73) Assignee: Mitsubishi Denki Kabushiki Kasiha, Tokyo (JP)

( * ) Notice: Subject to any disclaimer, the term of this patent is extended or adjusted under 35 U.S.C. 154(b) by 137 days.

(21) Appl. No.: 10/754,709

(22) Filed: Jan. 12, 2004

(65) Prior Publication Data

US 2005/0072622 A1    Apr. 7, 2005

(30) Foreign Application Priority Data

Oct. 7, 2003    (JP) ............................. 2003-348326

(51) Int. Cl.
- *B62D 5/04* (2006.01)
- *B62D 6/00* (2006.01)
- *H02P 7/00* (2006.01)

(52) U.S. Cl. .................. 180/446; 180/443; 318/432; 318/433; 701/41

(58) Field of Classification Search ................ 180/443, 180/446; 701/41, 42; 318/432, 433
See application file for complete search history.

(56) References Cited

U.S. PATENT DOCUMENTS

| | | | |
|---|---|---|---|
| 4,509,611 A * | 4/1985 | Kade et al. ................. | 180/446 |
| 5,894,206 A * | 4/1999 | Noro et al. ................. | 318/433 |
| 5,913,913 A * | 6/1999 | Okanoue et al. ............ | 701/41 |
| 5,927,430 A * | 7/1999 | Mukai et al. ............... | 180/446 |
| 6,026,926 A * | 2/2000 | Noro et al. ................. | 180/446 |
| 6,039,144 A * | 3/2000 | Chandy et al. ............. | 180/446 |
| 6,184,637 B1 * | 2/2001 | Yamawaki et al. ......... | 318/432 |
| 6,381,525 B1 * | 4/2002 | Hori et al. .................. | 701/41 |
| 6,404,156 B1 * | 6/2002 | Okanoue et al. ........... | 318/432 |
| 6,658,335 B1 * | 12/2003 | Kleinau ...................... | 701/41 |
| 2003/0117097 A1 * | 6/2003 | Iwata et al. ................. | 318/432 |
| 2006/0021822 A1 * | 2/2006 | Yamamoto .................. | 180/446 |

FOREIGN PATENT DOCUMENTS

| | | |
|---|---|---|
| JP | 62-181958 A | 10/1987 |
| JP | 07-081590 A | 3/1995 |

OTHER PUBLICATIONS

A Safety Evaluation for an Electric Power Steering System (Mitsubishi Electric Corp). By Society of Automotive Engineers of Japan Inc. Compendium of technical manuscripts No. 4-02.

* cited by examiner

*Primary Examiner*—Lesley D. Morris
*Assistant Examiner*—Daniel Yeagley
(74) *Attorney, Agent, or Firm*—Sughrue Mion, PLLC

(57) ABSTRACT

A motor-driven power steering control apparatus assuring consistently comfortable steering operation of a motor vehicle includes a steering state detecting (10), a motor drive command value arithmetic device (20), a trouble detector (40), a motor drive command value corrector (51, 52) for decrementing a motor drive command value outputted from the motor drive command value corrector (51) from a predetermined initial value as a function of time lapse when a trouble detection signal is outputted from the trouble detector (40), and an element (30) for driving an assist motor in conformance with the output of the motor drive command value corrector (51, 52). The motor drive command value corrector (51, 52) includes a low-pass filter (515) for smoothing the motor drive command value. A value acquired through the low-pass filter (515) is employed as the predetermined initial value.

3 Claims, 7 Drawing Sheets

MOTOR-DRIVEN POWER STEERING CONTROL APPARATUS

BACKGROUND OF THE INVENTION

1. Field of the Invention

The present invention generally relates to a motor-driven power steering control apparatus for controlling a motor-driven power steering system installed on an automobile or motor vehicle or the like. More particularly, the present invention is concerned with an improvement of the motor-driven power steering control apparatus such that steering operation can be performed without bringing about discomfort or offensiveness in the driver of the motor vehicle upon stoppage of a power assist in response to detection of an abnormality or trouble in the control apparatus.

2. Description of Related Art

The conventional motor-driven power steering control apparatus known heretofore includes a steering state detecting means composed of a steering torque detecting means for detecting a steering torque, a steering velocity detecting means for detecting a steering velocity and a vehicle speed detecting means for detecting a vehicle seed. Further, the control apparatus includes a motor drive command value arithmetic means for arithmetically determining a motor drive command value on the basis of a detection signal outputted from the steering state detecting means, a motor driving means for driving an assist motor of the steering system on the basis of the motor drive command value, a trouble detecting means for detecting a trouble of the control apparatus to output a trouble detection signal and a motor drive command value correcting means for decrementing as a function of time lapse the above-mentioned motor drive command value on the basis of the detection signal outputted from the trouble detecting means. (For more particulars, reference may have to be made to Japanese Patent Publication No. 94227/1995 and Japanese Patent Application Laid-Open Publication No. 81590/1995 (JP-A-1995-81590)).

In the conventional motor-driven power steering control apparatus mentioned above, the motor drive command value is not instantaneously set to zero when a trouble of the control apparatus is detected but the motor drive command value having been effective immediately before the occurrence of trouble is set as an initial value which is then gradually decreased or decremented as a function of time lapse to thereby suppress rapid change of the steering torque upon occurrence of the trouble so that the driver of the motor vehicle can get free of the feeling of discomfort in his or her steering operation.

The conventional motor-driven power steering control apparatus mentioned above suffers a problem that when occurrence of a trouble is detected in the control apparatus at the moment the driver turns quickly or steeply the steering wheel or the moment a wheel or wheels of the motor vehicle drop into a rut in a road in the course of running, the motor drive command value increased instantaneously is stored as the initial value to be decremented from which gradual decreasing or decrementing of the motor drive command value is started, as a result of which the driver will feel discomfort in the steering operation because it becomes light or heavy as compared with the ordinary steering.

In addition, when the driver reverses the steering direction in the course of decrementing the motor drive command value after detection of trouble in the control apparatus, the motor torque is imposed as a load on the driver, as a result of which the steering operation (i.e., manipulation of the steering wheel) becomes heavier, giving rise to a problem.

SUMMARY OF THE INVENTION

In the light of the state of the art described above, it is an object of the present invention to provide a motor-driven power steering control apparatus which is capable of mitigating or suppressing the feeling of discomfort in the steering operation even when occurrence of a trouble is detected in the control apparatus at the moment the driver turns quickly or steeply the steering wheel or the moment a wheel(s) of the motor vehicle drops into a rut or furrow in a road in the course of running.

In view of the above and other objects which will become apparent as the description proceeds, there is provided according to a general aspect of the present invention a motor-driven power steering control apparatus which includes a steering state detecting means for detecting a steering state of a steering system, a motor drive command value arithmetic means for arithmetically determining a motor drive command value for an assist motor of the steering system on the basis of a detection signal outputted from the steering state detecting means, a trouble detecting means designed for outputting a trouble detection signal upon detection of occurrence of a trouble in the motor-driven power steering control apparatus, a motor drive command value correcting means for processing the motor drive command value so that the motor drive command value is decremented from a predetermined initial value as a function of time lapse when the trouble detection signal is outputted from the trouble detecting means, and a motor driving means for driving the assist motor on the basis of the motor drive command value outputted from the motor drive command value correcting means.

The motor drive command value correcting means includes a smoothing means for smoothing the motor drive command value outputted from the motor drive command value arithmetic means, wherein a value acquired through the smoothing means is employed as the predetermined initial value.

By virtue of the arrangement of the motor-driven power steering control apparatus described above in which the motor drive command value is smoothed to be subsequently stored as the initial value to be decremented, it is possible to suppress or prevent positively the feeling of discomfort or offensiveness in the steering operation because even when the trouble of the motor-driven power steering control apparatus is detected at the moment the driver turns quickly or steeply the steering wheel or the moment a wheel of the motor vehicle drops into a rut in a road in the course of running, decrementing of the motor drive command value is not started from the instantaneously increased value.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
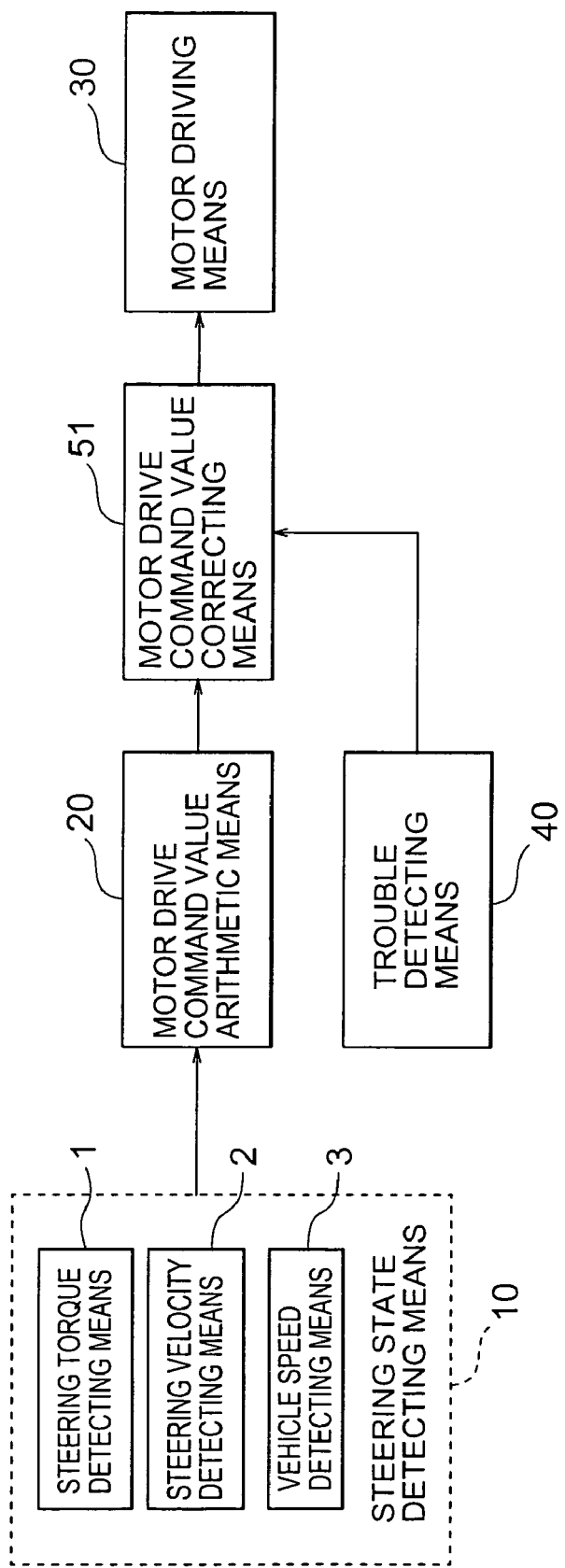
FIG. 1 is a block diagram showing generally and schematically a configuration of a motor-driven power steering control apparatus according to a first embodiment of the present invention.

The present invention will be described in detail in conjunction with what is presently considered as preferred or typical embodiments thereof by reference to the drawings. In the following description, like reference characters designate like or equivalent members or parts throughout the several views.

Embodiment 1

FIG. 1 is a block diagram showing generally and schematically a configuration of the motor-driven power steering control apparatus according to a first embodiment of the present invention.

The motor-driven power steering control apparatus now under consideration includes a steering state detecting means denoted generally by 10 which is composed of a steering torque detecting means 1 for detecting a steering torque, a steering velocity detecting means 2 for detecting a steering velocity and a vehicle speed detecting means 3 for detecting the speed of the motor vehicle equipped with the control apparatus. Further, the motor-driven power steering control apparatus includes a motor drive command value arithmetic means 20 for arithmetically determining a motor drive command value on the basis of the detection signal outputted from the steering state detecting means 10, a motor driving means 30 for driving an electric motor on the basis of the motor drive command value, a trouble detecting means 40 for detecting occurrence of trouble in the control apparatus to thereby output a trouble detection signal and a motor drive command value correcting means 51 for correcting the above-mentioned motor drive command value on the basis of the detection signal outputted from the trouble detecting means 40. The motor-driven power steering control apparatus according to the instant embodiment of the invention essentially differs from the conventional control apparatus known heretofore in respect to the structure of the motor drive command value correcting means 51. Except for this difference, the former is substantially identical with the latter.

Figure 2:
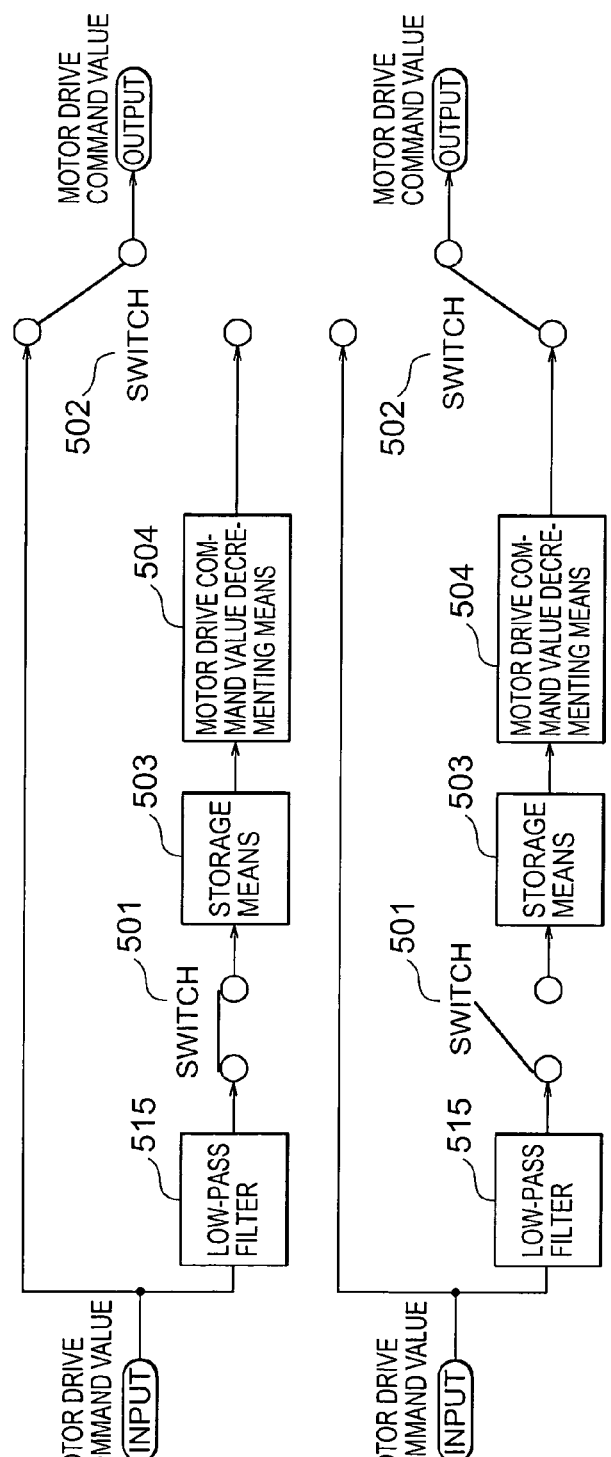
FIG. 2A is a block diagram showing a circuit state of a motor drive command value correcting means incorporated in the control apparatus shown in FIG. 1 when the latter is operating normally.
FIG. 2B is a block diagram showing a circuit state of the motor drive command value correcting means when a trouble or abnormality takes place in the motor-driven power steering control apparatus shown in FIG. 1.

FIGS. 2A and 2B are block diagrams showing a circuit arrangement of the motor drive command value correcting means 51 in different operating states, respectively.

As can be seen in these figures, the motor drive command value correcting means 51 is comprised of a low-pass filter 515 serving as a smoothing means employed for preventing from storage as the initial value to be decremented the motor drive command value which instantaneously increases at the moment the driver of the motor vehicle equipped with the control apparatus turns steeply or rapidly the steering wheel or when a wheel or wheels of the motor vehicle drops into a rut or furrow in a road, a storage means 503 for storing the initial value which is set as the motor drive command value to be gradually decreased or decremented (i.e., initial value to be decremented), a motor drive command value decrementing means 504 for decrementing (i.e., gradually decreasing) the motor drive command value as a function of time lapse, and switches 501 and 502.

Figure 3:
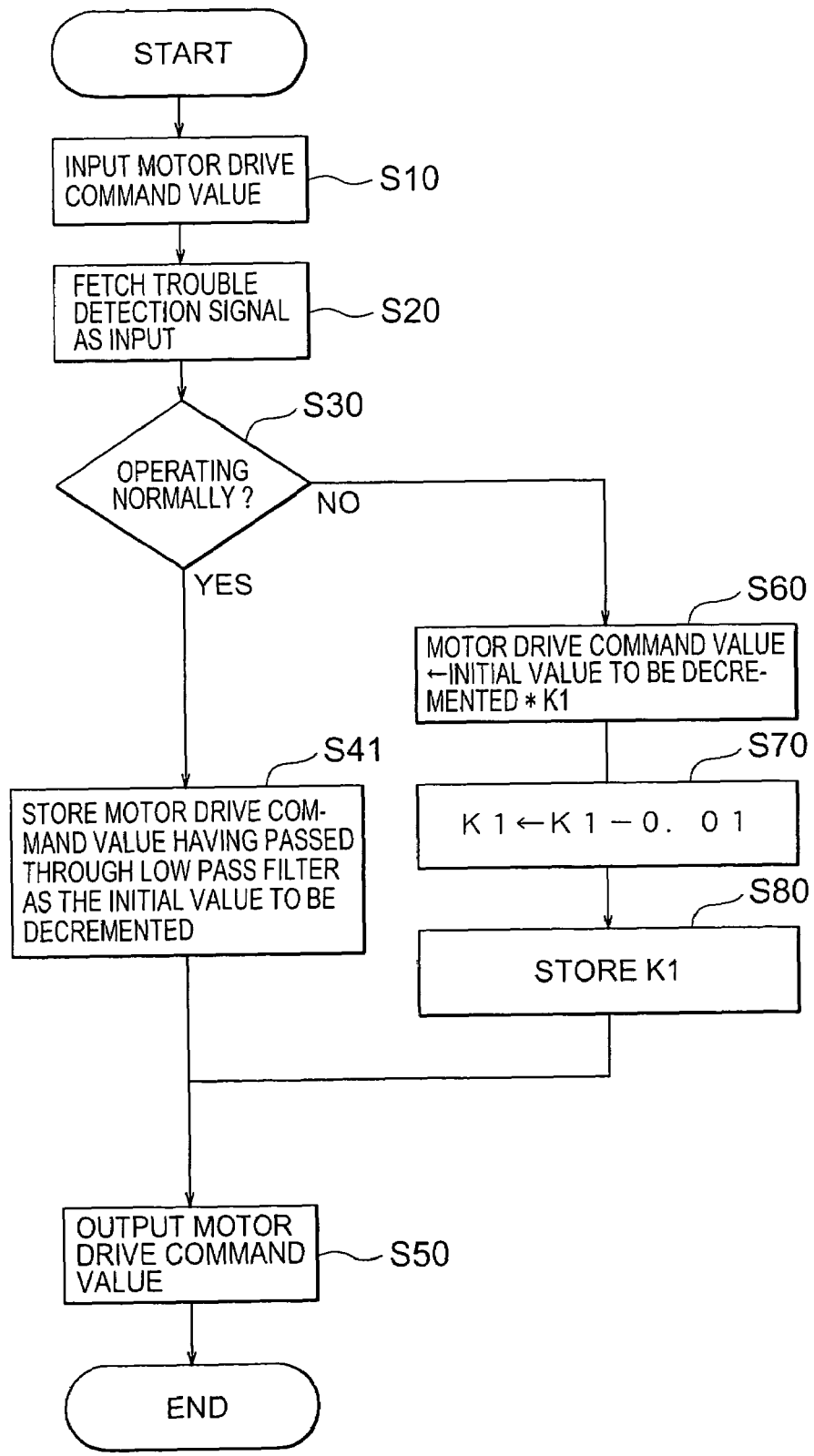
FIG. 3 is a flow chart for illustrating a processing procedure executed by the motor drive command value correcting means shown in FIG. 1.

FIG. 3 is a flow chart for illustrating an operation procedure or routine executed by the motor drive command value correcting means 51 periodically at a predetermined time interval.

Referring to FIG. 3, the motor drive command value is firstly inputted to the motor drive command value correcting means 51 in a step S10. Subsequently, a trouble detection signal is fetched from the output of the trouble detecting means 40 in a step S20 to thereby make decision as to whether or not the control apparatus is operating normally on the basis of the trouble detection signal in a step S30.

When it is decided in the step S30 that the control apparatus for the motor-driven power steering mechanism is operating normally (i.e., when the decision step S30 results in affirmation "Yes"), the motor drive command value correcting means 51 assumes such internal state that the low-pass filter 515 and the storage means 503 are electrically interconnected by means of the switch 501, as is shown in FIG. 2A. Thus, the motor drive command value inputted in the step S10 is smoothed through the low-pass filter 515 to be subsequently stored in the storage means 503 as the initial value to be decremented in a step S41. As mentioned previously, the low-pass filter 515 is employed with a view to inhibiting the storage of the motor drive command value increasing instantaneously as the initial value to be decremented. To this end, the cutoff frequency of this low-pass filter 515 is ordinarily set to a value within the range of 0.1 to 5 Hz in correspondence to the frequency occurring upon quick steering or that of disturbance originating from the road condition in order to suppress the influence of such quick steering and the disturbance. In this manner, the motor drive command value inputted in the step S10 is stored in the storage means 503 as the initial value to be decremented in the step S41 and at the same time outputted as the motor drive command value via the switch 502 in a step S50, whereupon the processing procedure or routine comes to an end.

On the other hand, when it is decided in the step S30 that the control apparatus suffers trouble (i.e., when the decision step S30 results in negation "No"), the motor drive command value correcting means 51 assumes such internal state that the electrical connection between the low-pass filter 515 and the storage means 503 is broken by means of the switch

501, as is shown in FIG. 2B. On the other hand, electrical connection is established between the motor drive command value decrementing means 504 and the output circuitry of the motor drive command value correcting means 51 by means of the switch 502.

Thus, the initial value to be decremented which is stored in the storage means 503 is inputted to the motor drive command value decrementing means 504 which is designed to perform the arithmetic operation in accordance with the undermentioned expression (1) in a step S60.

Motor drive command value=initial value to be decremented*K1        (Exp. 1)

where K1 represents a variable mentioned below.

Subsequently, the variable K1 is decremented in a step S70. The variable K1 is initialized to "1" at the start of operation of the apparatus. In this conjunction, it should be added that the lower limit of the variable K1 is zero. After storage of the variable K1 in a step S80, the motor drive command value is outputted in the step S50, whereupon the routine shown in FIG. 3 comes to an end.

The above-mentioned procedure or routine which starts from "START" and terminates at "END" is executed periodically at a predetermined control interval (e.g. every 1 msec or so), and every time the routine is executed, the step S70 is validated, whereby the value of the variable K1 mentioned above is gradually decreased, i.e., decremented, as a result of which the motor drive command value is gradually diminished or decremented as a function of time lapse.

As is apparent from the above, in the motor-driven power steering control apparatus according to the instant embodiment of the invention, the motor drive command value is stored in the storage means 503 as the initial value to be decremented after having passed through the low-pass filter 515 during the normal operation of the motor-driven power steering control apparatus. By virtue of this feature, even when a trouble of the control apparatus is detected at the moment the driver turns quickly or steeply the steering wheel or the moment a wheel or wheels of the motor vehicle drop into a rut in a road in the course of running, decrementing of the motor drive command value is not started from a large value generated instantaneously, whereby feeling of discomfort or offensiveness in the steering operation can positively be suppressed or prevented.

Incidentally, although it has been mentioned that the cutoff frequency of the low-pass filter 515 is set at a value roughly within the range of 0.1 to 5 Hz, the invention is never restricted thereto. A low-pass filter whose cutoff frequency can dynamically be changed may equally be employed.

More specifically, when the steering velocity or differential value thereof (or alternatively motor rotation speed or differential value thereof) attains or exceeds a predetermined value, it is then decided that the driver quickly turns the steering wheel. In that case, the cutoff frequency of the low-pass filter may be changed to a smaller value than the ordinarily validated one. With this arrangement, optimum cutoff frequencies can be set for the situation in which the trouble of the control apparatus is detected at the moment the driver turns quickly or steeply the steering wheel and the situation in which the trouble of the control apparatus is detected at the moment the wheel(s) of the motor vehicle drops into a rut in a road in the course of running, respectively, whereby the feeling of discomfort in the steering operation can be suppressed more positively.

In this conjunction, it should be added that the quick turning of the steering wheel by the driver may be detected on the basis of the steering torque, the output value of the motor drive command value arithmetic means 20, the differential value thereof or the like.

Further, although it has been described that in the motor-driven power steering control apparatus according to the instant embodiment of the invention, the low-pass filter 515 is employed as the means for smoothing the motor drive command value, the present invention is not restricted thereto either.

By way of example, a smoothing means designed for outputting a mean value (moving average) within a predetermined time period or a median may equally be employed. In this case, the frequency filtering characteristics can be changed in dependence on the length of the predetermined time mentioned above. Accordingly, by setting the above-mentioned predetermined time longer than the ordinary one, it is possible to set the optimal frequency filtering characteristics, for the case where trouble of the control apparatus is detected at the moment the driver quickly turns the steering wheel and the case where trouble of the control apparatus is detected at the moment the wheel(s) of the motor vehicle drops into a rut in a road in the course of running, respectively, whereby the feeling of discomfort or offensiveness in the steering operation can satisfactory be mitigated or suppressed.

Besides, although it has been described that in the motor-driven power steering control apparatus according to the instant embodiment of the invention, the motor drive command value is stored in the storage means 503 as the initial value to be decremented after having passed through the low-pass filter 515 during the normal operation of the control apparatus, it is possible to provide a means for limiting a maximum value of the initial value to be decremented (absolute maximum value) in place of the low-pass filter 515 so that the motor drive command value which increases instantaneously at the moment the driver quickly turns the steering wheel or when the wheel of the motor vehicle drops into a rut in a road in the course of running is inhibited from being stored as the initial value to be decremented. With this arrangement, the feeling of discomfort in the steering operation may occur more or less when compared with the arrangement in which the low-pass filter 515 is employed. However, when compared with the conventional motor-driven power steering control apparatus, the feeling of discomfort or offensiveness in the steering operation can be suppressed more satisfactory at a lower cost than the case where the low-pass filter 515 is employed.

Embodiment 2

Figure 4:
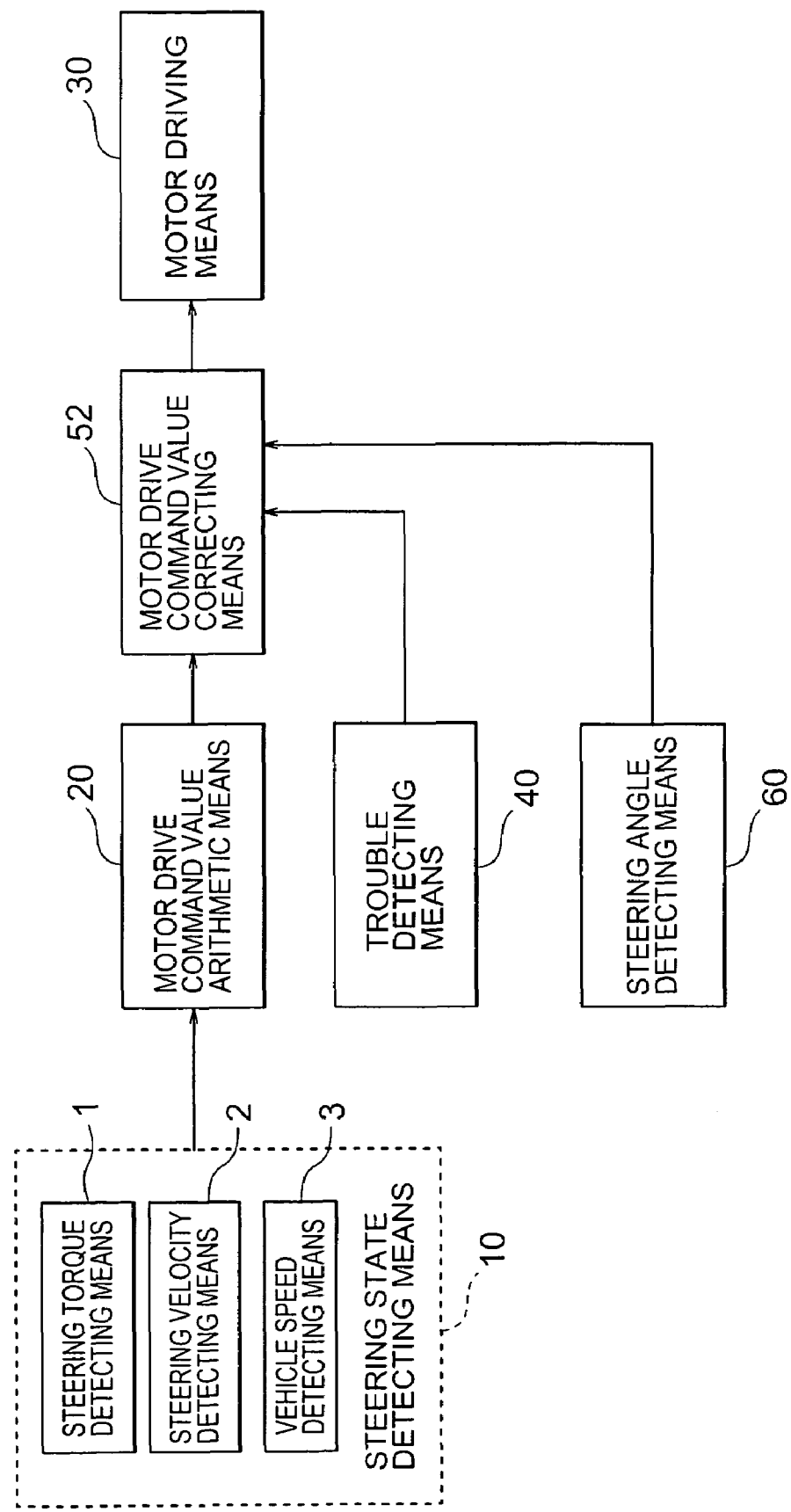
FIG. 4 is a block diagram showing generally and schematically a configuration of the motor-driven power steering control apparatus according to a second embodiment of the present invention.

FIG. 4 is a block diagram showing generally and schematically a structure of the motor-driven power steering control apparatus according to a second embodiment of the present invention.

The motor-driven power steering control apparatus according to the instant embodiment of the invention is similar to that shown in FIG. 1 except for the motor drive command value correcting means designated by reference numeral 52 in FIG. 4 and the additional provision of a steering angle detecting means 60.

The motor drive command value correcting means 52 mentioned above is designed to correct the motor drive command value in response to the detection signal outputted from the trouble detecting means 40. On the other hand, the steering angle detecting means 60 is designed to detect the current steering angle.

Figure 5:
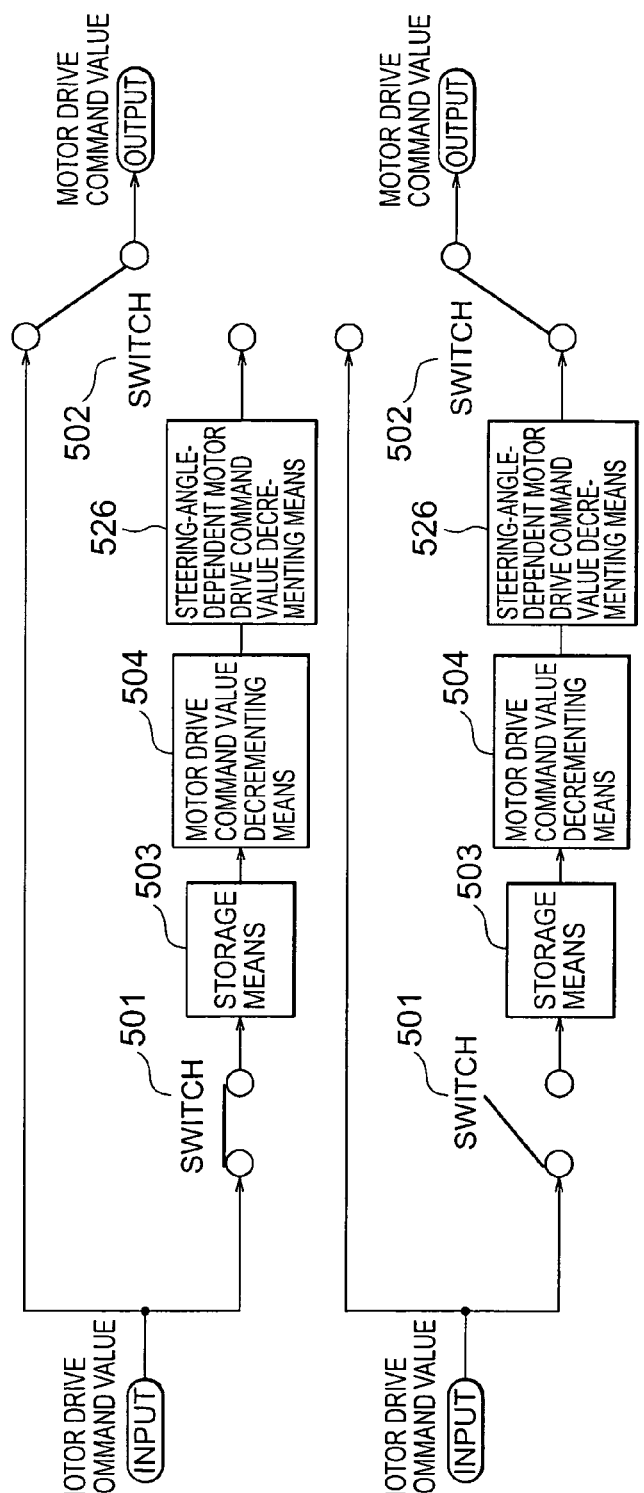
FIG. 5A is a block diagram showing a circuit state of a motor drive command value correcting means incorporated in the motor-driven power steering control apparatus shown in FIG. 4 when the latter is operating normally.
FIG. 5B is a block diagram showing a circuit state of the motor drive command value correcting means when a trouble takes place in the motor-driven power steering control apparatus shown in FIG. 4.

FIGS. 5A and 5B are block diagrams showing a circuit arrangement of the motor drive command value correcting means 52 in different operation states, respectively. The motor drive command value correcting means 52 differs from the conventional one in that a steering-angle-dependent motor drive command value decrementing means 526 designed for decreasing gradually or decrementing the motor drive command value as the steering angle becomes smaller is additionally incorporated.

Figure 6:
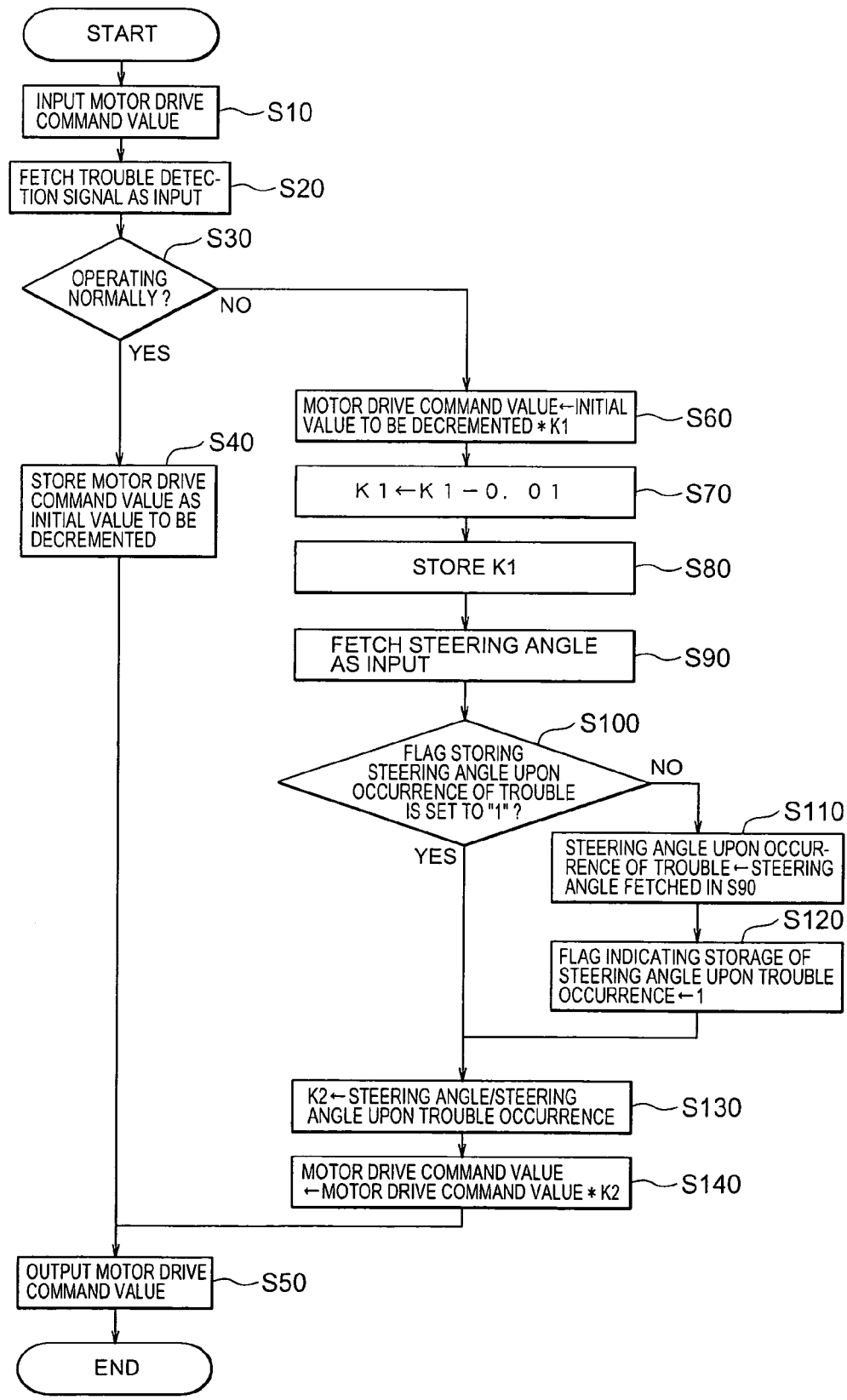
FIG. 6 is a flow chart for illustrating a processing procedure executed by the motor drive command value correcting means shown in FIG. 4.

FIG. 6 is a flow chart for illustrating a processing procedure or routine executed by the motor drive command value correcting means 52 periodically at a predetermined time interval.

The processing routine shown in FIG. 6 differs from the one shown in FIG. 3 substantially in the respect that steps S90 to S140 are additionally provided and the step S41 is replaced by a step S40.

In the case where it is decided in the step S30 that the motor-driven power steering control apparatus suffers a trouble (i.e., when the decision step S30 results in negation "No"), the motor drive command value correcting means 52 assumes such an internal state as shown in FIG. 5B. In this state, the processing of decreasing gradually or decrementing the motor drive command value as a function of time lapse is executed by the motor drive command value decrementing means 504 in the steps S60 to S80, as described hereinbefore in conjunction with the first embodiment of the invention.

In the motor-driven power steering control apparatus according to the instant embodiment of the invention, the steering angle is subsequently fetched as the input (step S90) to make decision as to whether or not the steering angle at the time point of occurrence of trouble has already been stored (i.e., whether or not the corresponding flag is "1") (step S100). Unless the steering angle at the time point of occurrence of trouble is stored (i.e., when the decision step S100 results in "No"), the steering angle fetched in the step S90 is stored as the steering angle at the time point of occurrence of trouble (step S110), whereon the flag indicating storage of the steering angle at the time point of occurrence of trouble has been stored is set (step S120).

In succession, the motor drive command value is arithmetically determined in accordance with the undermentioned expression (2) in the steps S130 to S140 to be outputted (step S50), whereupon the routine shown in FIG. 6 comes to an end.

Motor drive command value=motor drive command value determined in the step S60)*K2  (Exp. 2)

where K2 represents a quotient value resulting from division of the steering angle by the steering angle at the time point of occurrence of trouble. The upper limit of K2 is "1" (one). When the value of K2 in the current routine is greater than the preceding one, then the value of K2 in the preceding routine is adopted.

As is obvious from the above, with the structure of the control apparatus for the motor-driven power steering system according to the second embodiment of the invention described above, the motor drive command value is gradually decreased or decremented as the function of time lapse upon detection of trouble in the control apparatus and additionally the motor drive command value is further decremented as the steering angle becomes smaller. By virtue of this feature, such situation that the motor torque imposes a load on the driver can positively be avoided. Thus, the driver can get free of the feeling of discomfort in his or her steering operation even in the case where the steering direction is reversed when the motor drive command value is being decremented.

At this juncture, it should be mentioned that although the motor drive command value is decremented as the steering angle becomes smaller, the present invention is never restricted thereto. The motor drive command value may be decremented in dependence on other quantity equivalent to the steering angle such as an estimated road surface reaction, differential value of the steering velocity or the like, as is disclosed in Japanese Patent Application Laid-Open Publication No. 122146/2001 (JP-A-2001-122146).

Furthermore, in the motor-driven power steering control apparatus according to the instant embodiment of the invention, the steering angle detecting means 60 is provided for detecting the steering angle in order to decrement additionally the motor drive command value as the steering angle becomes smaller. It should however be mentioned that a steering neutral point detecting means may be employed in place of the steering angle detecting means 60 for detecting the zero steering angle or the position equivalent thereto (e.g. position at which the estimated road surface reaction is zero, as disclosed in e.g. Japanese Patent Application Laid-Open Publication No. 122146/2001).

Figure 7:
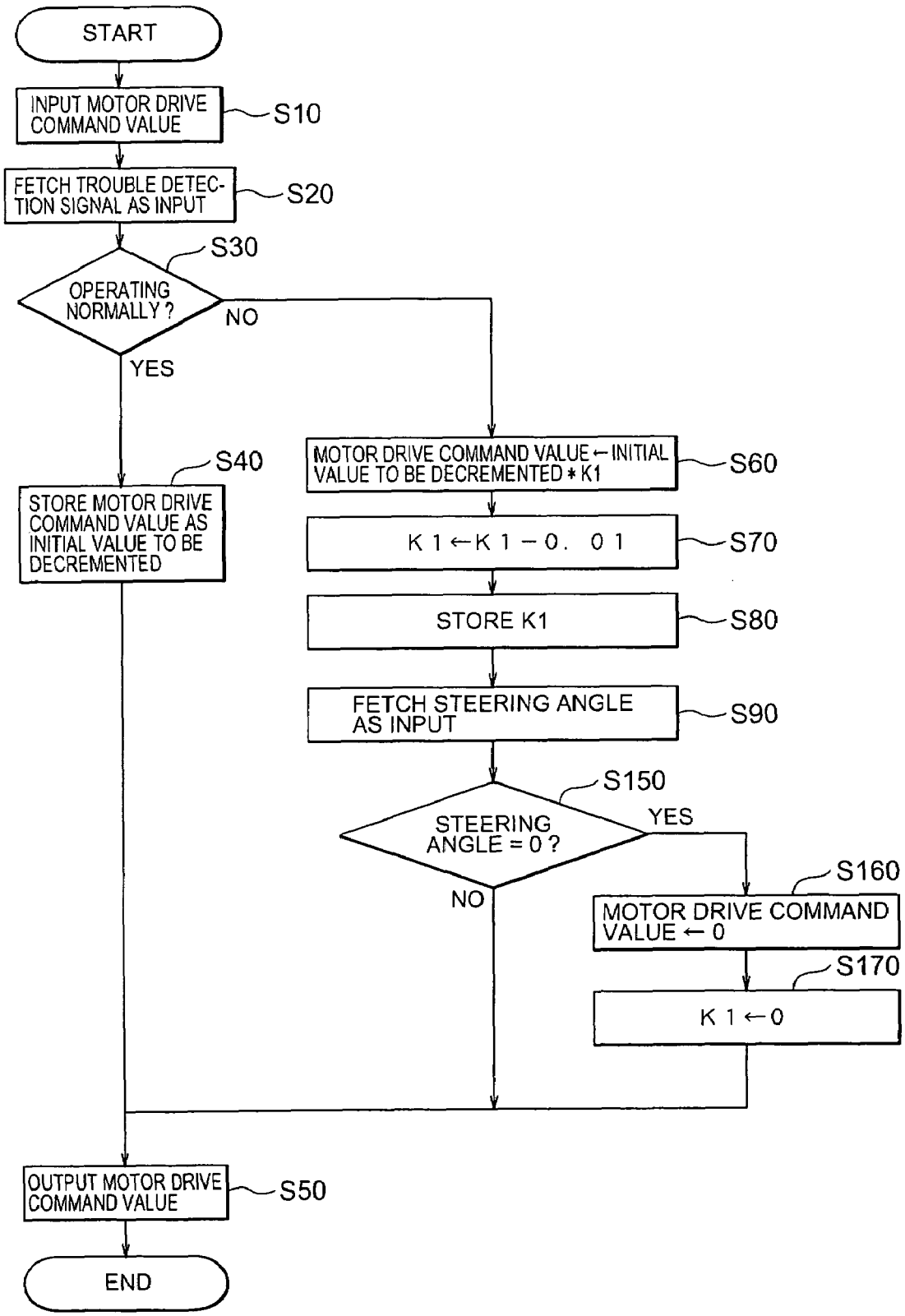
FIG. 7 is a flow chart for illustrating a processing procedure which may also be executed by the motor drive command value correcting means shown in FIG. 4 according to another embodiment of the present invention.

More specifically, such arrangement may be adopted that upon detection of the steering neutral point through the processings executed in steps S150 to S170 of the flow chart shown in FIG. 7, the motor drive command value is set to zero. In that case, although the feeling of discomfort in the steering operation may occur more or less when compared with the case where the steering angle detecting means is employed, it is possible to enfeeble the feeling of discomfort in the steering operation more positively than the conventional apparatus with inexpensive structure as compared with the case where the steering angle detecting means is employed.

Furthermore, it should also be added that in the motor-driven power steering control apparatus according to the first and second embodiments of the invention, the motor drive command value is decremented as a function of time lapse by using the variable K1 so that the motor torque decreases by 1% every predetermined period or time interval (see step S70 in FIGS. 3, 6 and 7). However, the present invention is never restricted to the gradual decrease rate of 1% but it may be selectively and properly set in view of the specifications or the like of the type of the motor vehicle as concerned.

Moreover, the motor drive command value may arithmetically be determined in accordance with the undermentioned expression (3) to thereby decrement the motor drive command value such that the motor torque decreases at a predetermined rate every predetermined period.

Motor drive command value=sign of initial value to be decremented*(|initial value to be decremented|−A)  (Exp. 3)

In the above expression (3), the value A is initialized to zero upon starting of operation of the control apparatus and incremented at a predetermined rate every predetermined time interval when it is decided that the control apparatus suffers trouble. Incidentally, the upper limit of "A" is the absolute initial value to be decremented.

Further, in the motor-driven power steering control apparatus according to the first and second embodiments of the invention, the motor drive command value correcting means 51; 52 is arranged to decrement the motor drive command value on the basis of the detection signal outputted from the trouble detecting means 40. However, such arrangement may equally be adopted that the motor drive command value correcting means 51; 52 is replaced by a steering torque signal correcting means which is so designed as to fetch the steering torque signal and the trouble detection signal as the inputs to thereby output the steering torque signal to the motor drive command value arithmetic means while decrementing the steering torque signal similarly to the decrementing of the motor drive command value effected by the motor drive command value correcting means 51; 52 in the motor-driven power steering control apparatus described hereinbefore in conjunction with the first and second embodiments of the invention, to the substantially same advantageous effects.

Besides, the motor drive command value arithmetic means 20 of the motor-driven power steering control apparatus according to the first and second embodiments of the invention may be so implemented as to arithmetically determine either the target current of the motor (i.e., torque to be generated by the motor) or the duty ratio for driving the motor under the PWM (Pulse-Width Modulation) control.

Additionally, in the motor-driven power steering control apparatuses described above, it is assumed that the trouble detecting means is designed for detecting the trouble of the motor-driven power steering control apparatus to output the trouble detection signal. In this conjunction, it goes without saying that the trouble detecting means may be so arranged as to detect occurrence of troubles in the assist motor, the steering angle detecting means and the steering neutral point detecting means, respectively, in addition to the trouble of the control apparatus.

Many modifications and variations of the present invention are possible in the light of the above disclosure. It is therefore to be understood that within the scope of the appended claims, the invention may be practiced otherwise than as specifically described.

What is claimed is:

1. A motor-driven power steering control apparatus, comprising:
    steering state detecting means for detecting a steering state of a steering system;
    motor drive command value arithmetic means for arithmetically determining a motor drive command value for an assist motor of said steering system on the basis of a detection signal outputted from said steering state detecting means;
    trouble detecting means designed for outputting a trouble detection signal upon detection of trouble in said motor-driven power steering control apparatus;
    motor drive command value correcting means for processing said motor drive command value so that said motor drive command value is decremented from a predetermined initial value as a function of time lapse when the trouble detection signal is outputted from said trouble detecting means; and
    motor driving means for driving said assist motor on the basis of the motor drive command value outputted from said motor drive command value correcting means,
    wherein said motor drive command value correcting means includes
    smoothing means for smoothing said motor drive command value outputted from said motor drive command value arithmetic means, and
    wherein a value acquired through said smoothing means is employed as said predetermined initial value.

2. A motor-driven power steering control apparatus according to claim 1, said smoothing means is implemented as a low-pass filter capable of dynamically changing over frequency filtering characteristics.

3. A motor-driven power steering control apparatus, comprising:
    steering state detecting means for detecting a steering state of a steering system;
    motor drive command value arithmetic means for arithmetically determining a motor drive command value for an assist motor of said steering system on the basis of a detection signal outputted from said steering state detecting means;
    trouble detecting means designed for outputting a trouble detection signal upon detection of trouble in said motor-driven power steering control apparatus;
    motor drive command value correcting means for processing said motor drive command value so that said motor drive command value is decremented from a predetermined initial value as a function of time lapse when the trouble detection signal is outputted from said trouble detecting means; and
    motor driving means for driving said assist motor on the basis of the motor drive command value outputted from said motor drive command value correcting means,
    wherein said motor drive command value correcting means is so designed as to employ as said predetermined initial value a value whose maximum is previously limited.

* * * * *